US012050262B2

(12) United States Patent
Pennings

(10) Patent No.: US 12,050,262 B2
(45) Date of Patent: Jul. 30, 2024

(54) SYNTHETIC APERTURE RADAR SIMULATION

(71) Applicant: R2 Space, LLC, Ann Arbor, MI (US)

(72) Inventor: Jeffrey Scott Pennings, Ann Arbor, MI (US)

(73) Assignee: R2 SPACE, LLC, Ann Arbor, MI (US)

( * ) Notice: Subject to any disclaimer, the term of this patent is extended or adjusted under 35 U.S.C. 154(b) by 322 days.

(21) Appl. No.: 17/695,120

(22) Filed: Mar. 15, 2022

(65) Prior Publication Data

US 2022/0308203 A1 Sep. 29, 2022

Related U.S. Application Data

(60) Provisional application No. 63/165,590, filed on Mar. 24, 2021.

(51) Int. Cl.
*G01S 13/90* (2006.01)
*G01S 7/41* (2006.01)

(52) U.S. Cl.
CPC .......... *G01S 13/9094* (2013.01); *G01S 7/418* (2013.01); *G01S 13/9027* (2019.05)

(58) Field of Classification Search
CPC .. G01S 13/9094; G01S 7/418; G01S 13/9027; G01S 13/9004; G01S 13/90
See application file for complete search history.

(56) References Cited

U.S. PATENT DOCUMENTS

| 4,551,724 A | * | 11/1985 | Goldstein | G01S 13/9023 342/25 C |
| 5,170,171 A | * | 12/1992 | Brown | G01S 13/9023 342/25 C |
| 5,189,424 A | * | 2/1993 | Brown | G01S 13/9023 342/25 C |
| 5,489,907 A | * | 2/1996 | Zink | G01S 13/9092 342/25 C |
| 5,680,138 A | * | 10/1997 | Pritt | G01S 13/9027 342/25 A |

(Continued)

FOREIGN PATENT DOCUMENTS

| JP | 07199804 A | * | 12/1993 | ............. G01S 13/90 |
| JP | H0772244 A | * | 3/1995 | ............. G01S 13/90 |

(Continued)

*Primary Examiner* — Bernarr E Gregory

(57) ABSTRACT

Various embodiments of the present technology generally relate to systems, methods, and computer-readable media for simulating synthetic aperture radar (SAR) images to be captured by a radar-based imaging system. SAR technology can be used to capture large areas on Earth, from a satellite in space for example, over a single pass. A further pass over the target area can help identify changes in the landscape, scenery, and/or infrastructure providing insight on change detection, temporal analysis, or other measures; however, repeat passes over the target area may have been made from differing angles resulting in artifacts in one or both of the processed images from the two passes. In various embodiments, information about the topology of the target area, and information about the SAR platform's flight path are used to simulate the slant range distortion effects that are to be expected in the SAR image of for that pass.

20 Claims, 8 Drawing Sheets

(56) References Cited

U.S. PATENT DOCUMENTS

| | | | | |
|---|---|---|---|---|
| 7,551,119 B1* | 6/2009 | Doerry | ............... | G01S 13/904 |
| | | | | 342/25 R |
| 2012/0218140 A1* | 8/2012 | Bergeron | ............ | G01S 13/9005 |
| | | | | 342/25 A |
| 2021/0003697 A1* | 1/2021 | Zhai | .................... | G01S 13/9004 |
| 2021/0003699 A1* | 1/2021 | Zhai | .................... | G01S 13/9027 |

FOREIGN PATENT DOCUMENTS

| | | | | | | |
|---|---|---|---|---|---|---|
| JP | | 2001091649 A | * | 4/2001 | ............ | G01S 13/90 |
| JP | | 2001091650 A | * | 4/2001 | ............ | G01S 13/90 |
| JP | | 2008185375 A | * | 8/2008 | ............ | G01S 13/90 |
| JP | | 2015079296 A | * | 4/2015 | ............ | G01S 13/90 |
| JP | | 2016057092 A | * | 4/2016 | ............ | G01S 13/90 |

* cited by examiner

SYNTHETIC APERTURE RADAR SIMULATION

RELATED APPLICATIONS

This application hereby claims the benefit and priority to U.S. Provisional Application No. 63/165,590, titled "SYNTHETIC APERTURE RADAR SIMULATION," filed Mar. 24, 2021, which is hereby incorporated by reference in its entirety.

TECHNICAL FIELD

Aspects of the present technology are generally related to the field of synthetic aperture radar (SAR), and more specifically, to computer simulation of expected SAR images.

BACKGROUND

This section provides background information related to the present disclosure which is not necessarily prior art.

A Synthetic Aperture Radar (SAR), or SAR, is a coherent, mostly airborne or spaceborne side-looking radar system which utilizes the flight path of the platform to simulate an extremely large antenna or aperture electronically, and that generates high-resolution remote sensing imagery. To create a SAR image, successive pulses of radio waves are transmitted to "illuminate" a target scene, and the echo of each pulse is received and recorded. The pulses may be transmitted, and the echoes received, using a single beam-forming antenna, with wavelengths of a meter down to several millimeters. As the SAR device on board the aircraft or spacecraft moves, the antenna location relative to the target changes with time. Signal processing of the successive recorded radar echoes allows the combining of the recordings from these multiple antenna positions to form images of the target scene. This process forms the synthetic antenna aperture and allows the creation of higher-resolution images than would otherwise be possible with a given physical antenna.

SUMMARY

One or more embodiments described herein, among other benefits, solve one or more of the foregoing or other problems in the art by providing systems, methods, and non-transitory computer readable media for simulating slant range distortion effects on synthetic aperture radar (SAR) images. In some implementations, the technology described includes a method comprising: receiving, for a target area having a topology, target topology information; receiving, for a synthetic aperture radar (SAR) platform, flight path information for a first pass of the platform that scans the target area; and, based on the target topology information and the flight path information, simulating at least one slant range distortion effect on a first SAR image of the target area.

In some implementations, the technology described includes a method comprising: receiving, for a target area having a topology, target topology information; receiving, for a synthetic aperture radar (SAR) platform, first flight path information for a first pass of the platform that scans the target area; based on the target topology information and the first flight path information, simulating at least one slant range distortion effect on a first SAR image of the target area; receiving, for the SAR platform, second flight path information for a second pass of the platform that scans the target area; based on the target topology information and the second flight path information, simulating at least one slant range distortion effect on a second SAR image of the target area; and, based on the simulation of the at least one slant range distortion effect on the first SAR image of the target area and the simulation of the at least one slant range distortion effect on the second SAR image of the target area, analyzing at least one of the first SAR image and the second SAR image.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

Figure 1A:
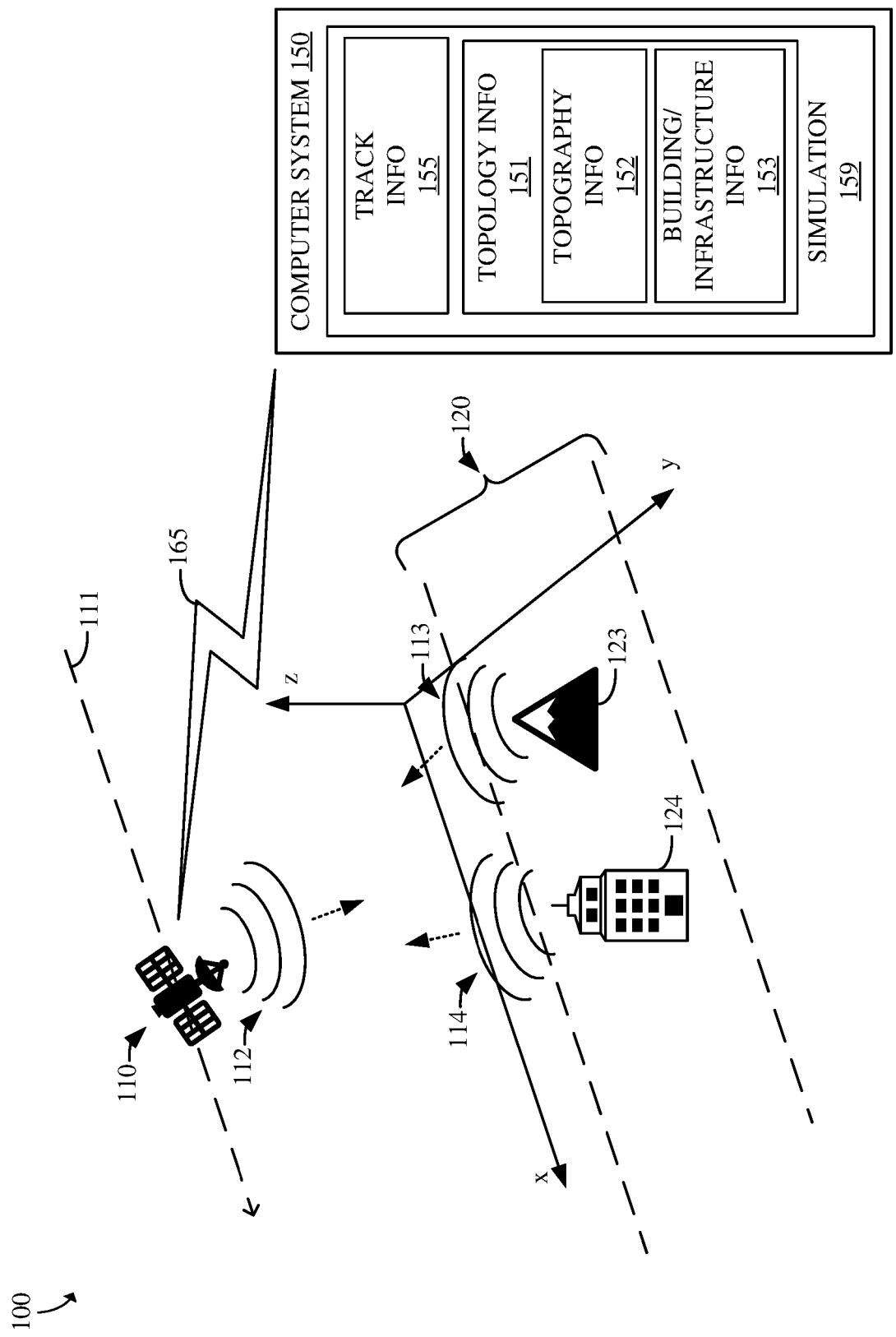
FIG. 1A is a diagram illustrating a synthetic aperture radar simulation system.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Example implementations are provided so that this disclosure will be thorough and will fully convey the scope to persons skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Various embodiments of the present technology generally relate to systems, methods, and computer-readable media for simulating synthetic aperture radar images to be captured by a radar-based imaging system. Synthetic aperture radar (SAR) technology is used to capture large areas on Earth from far distances, such as from a satellite in space. Using SAR equipment, equipped to a satellite for example, allows for efficient and cheap capturing of a target area over a single pass of the satellite. A further pass over the target area can help identify changes in the landscape, scenery, and/or infrastructure providing insight on change detection or other measures. However, the passes over the target area may have been made from differing angles (e.g., slant angle) or satellite positions (e.g., orbit coordinates). These differing capture geometries may result in artifacts in one or both of the processed images from the two passes.

In an embodiment, information about the topology of the target area, and information about the SAR platform's flight path are used to simulate the slant range distortion effects that are to be expected in the SAR image of for that pass. This topology information may include, but is not limited to, building footprints, landscape and geological structure, and elevation data (e.g., digital elevation models—DEMs). In an embodiment, a second image may be produced that compensates for the simulated slant range distortion effect. For example, if a building in the target area is expected to appear in a different position due to the layover effect, a second image (e.g., from actual SAR data from the pass) may be produced that moves the building to where it should appear in the SAR image. In this manner, better comparisons between images from different passes can be made. By way of another example, temporal change in the landscape of the target area can be detected by identifying and removing topological and/or building footprint changes. Thus, the second image produced can simulate changes not associated with specific buildings in the data.

FIG. 1A is a diagram illustrating a synthetic aperture radar simulation system. In FIG. 1, system 100 includes SAR satellite 110, flight path 111, radar signal 112, radar returns 113-114, target area 120, topography 123, building/infrastructure 124, computer system 150, and communication link 165. Radar signal 112 is emitted by satellite 110 to illuminate target area 120. Radar returns 113-114 bounce off of topography 123 and buildings 124, respectively. Satellite 110 receives radar returns 113-114 and transmits information about radar returns 113-114 to computer system 150.

Computer system 150 includes simulation 159. Simulation 159 includes flight track information 155 and topology information 151. Topology information 151 include topography information 152 and building information 153.

Figure 1B:
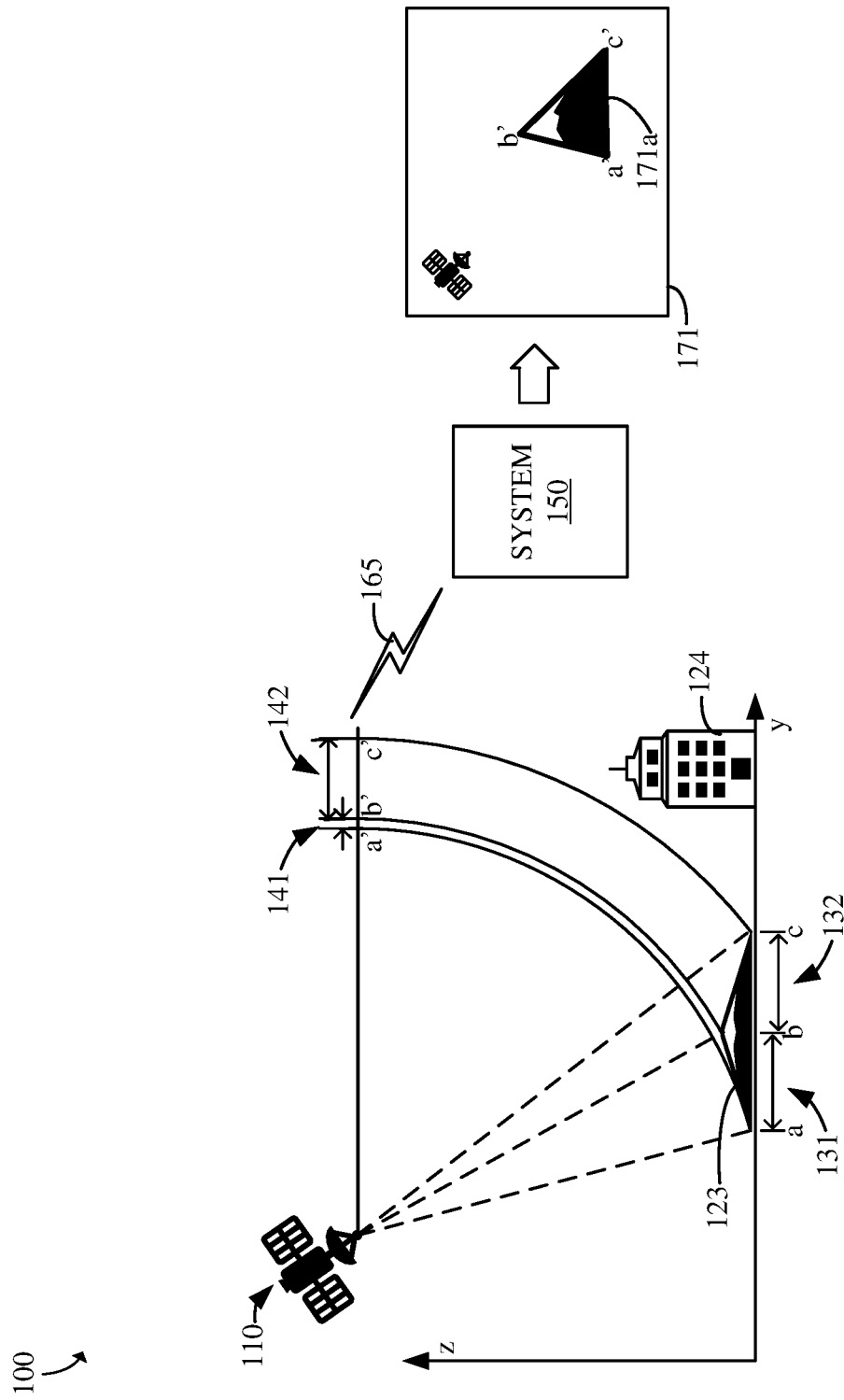
FIG. 1B is a diagram illustrating the synthetic aperture radar simulation system generating foreshortened image features.

FIG. 1B is a diagram illustrating the synthetic aperture radar simulation system generating foreshortened image features. In FIG. 1B, satellite 110 will be illuminating topography 123 (e.g., a mountain). For the flight path 111 being simulated, the radar signal 112 from satellite 110 will reach the base of topography 123 (position a) before radar signal 112 reaches the top of topography 123 (position b). Because system 100 measures distance in slant-range, the slope of topography 123 the radar return 113-114 information that will be transmitted to system 150 will be compressed. This is illustrated in FIG. 1B by distance a-b 131 being longer than distance a'-b' 141. In FIG. 1B, distance b-c 132 and distance b'-c' 142 is also illustrated.

System 150 uses topology information 151 (and topography information 152 and building information 153, in particular) to generate simulated image 171 that illustrates the foreshortened image 171a of topography 123. In FIG. 1B, the image 171a of topography 123 is illustrated with b' being displaced closer to a' when compared to distance a-b 131.

Figure 1C:
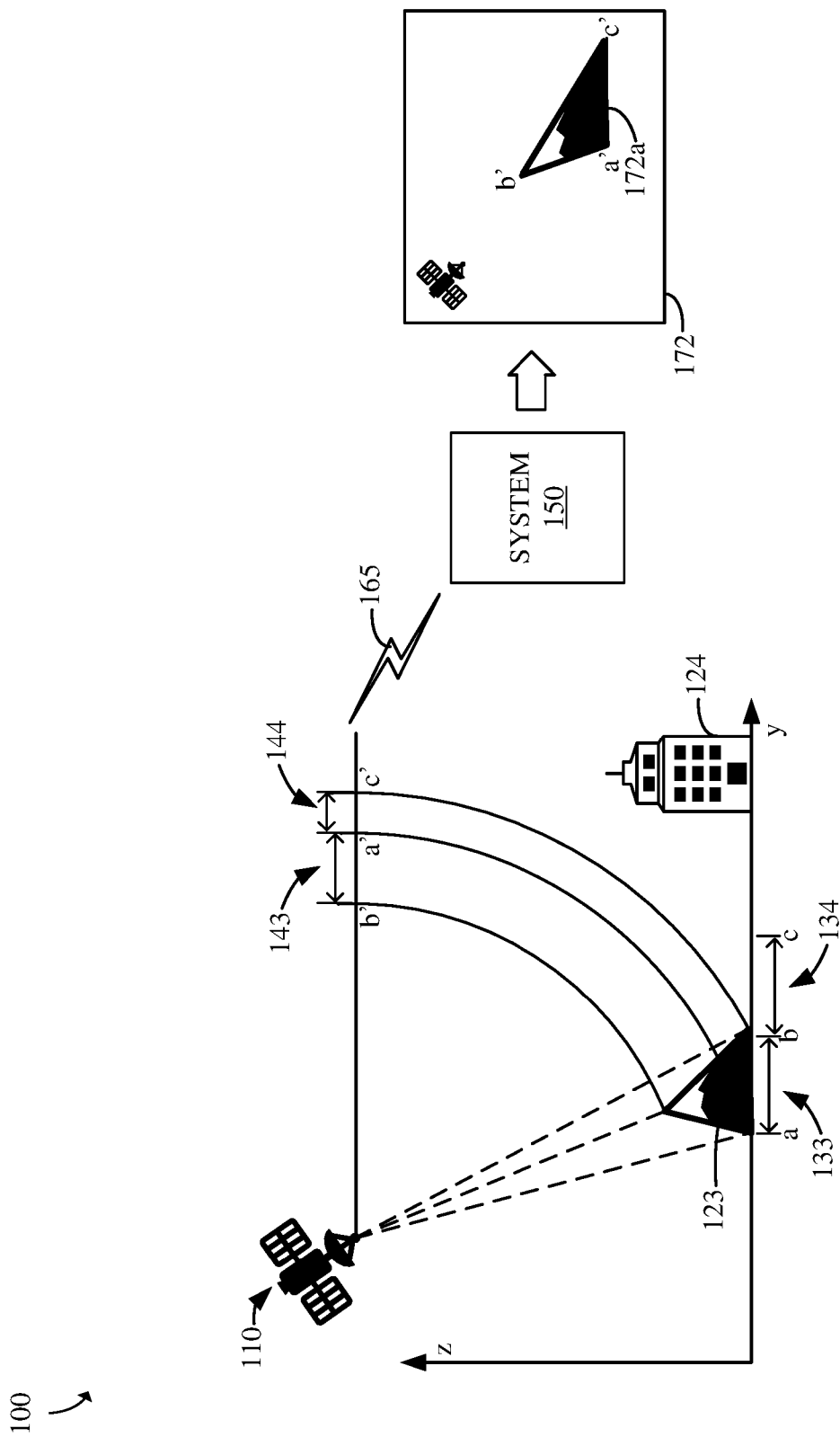
FIG. 1C is a diagram illustrating the synthetic aperture radar simulation system generating image features with layover.

FIG. 1C is a diagram illustrating the synthetic aperture radar simulation system generating image features with layover. In FIG. 1C, satellite 110 will be illuminating topography 123 (e.g., a mountain). For the flight path 111 being simulated, the radar signal 112 from satellite 110 will reach the top of topography 123 (position b) before radar signal 112 reaches the base of topography 123 (position a). Thus, the return signal 113 from the top of topography 123 (position b) will be received before the return signal 113 from the base (position a) of topography 123. Because system 100 measures distance in slant-range, the slope of topography 123 the radar return 113-114 information that will be transmitted to system 150 will correspond to position b being closer to satellite 110 than position a. This is illustrated in FIG. 1C by distance 133 from a to b on the ground being reflected in the reversed positions of a' and b' in distance 144. In FIG. 1C, distance b-c 134 and distance b'-c' 144 is also illustrated.

System 150 uses topology information 151 (and topography information 152 and building information 153, in particular) to generate simulated image 172 that illustrates the "laid over" image 172*a* of topography 123. In FIG. 1C, the image 172*a* of topography 123 is illustrated with the positions of b' and a' being reversed with respect to positions a and b of topography 123.

Figure 1D:
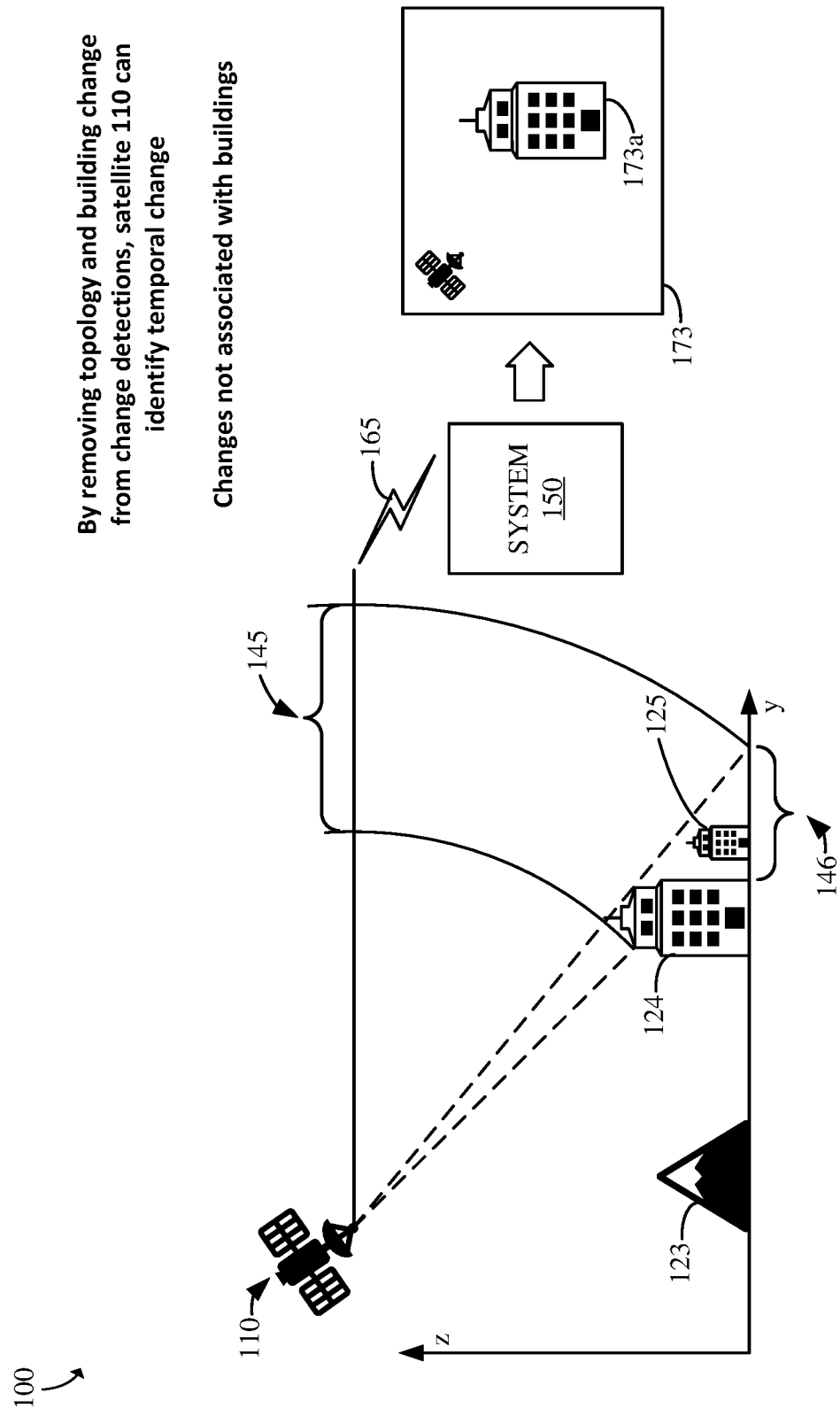
FIG. 1D is a diagram illustrating the synthetic aperture radar simulation system generating image features with shadowing.

FIG. 1D is a diagram illustrating the synthetic aperture radar simulation system generating image features with shadowing. In FIG. 1D, satellite 110 will be illuminating building 124 and building 125. For the flight path 111 being simulated, the radar signal 112 from satellite 110 that should strike building 125 is blocked by building 124. Thus, no return signal 114 will be received from building 125. Accordingly, the return 113-114 information that will be transmitted to system 150 will not show building 125 or the corresponding landscape and topographical data surrounding building 125. This is illustrated in FIG. 1D by area 146 not including data in the signal 145.

System 150 uses topology information 151 (and topography information 152 and building information 153, in particular) to generate simulated image 173 that illustrates the "shadowed" image that includes an image 173*a* of building 124 but does not include an image of building 125 or its surrounding landscape.

Figure 2:
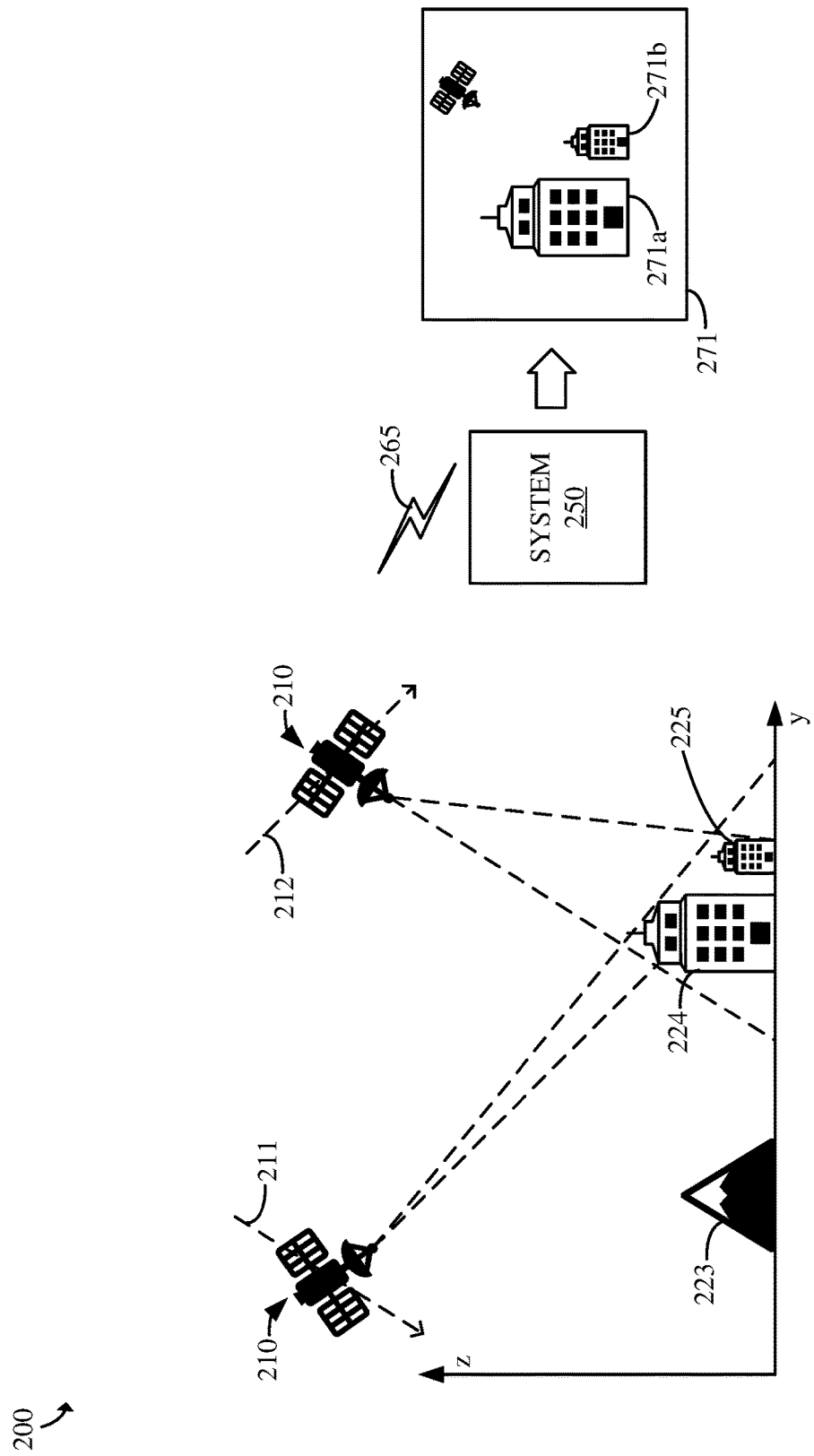
FIG. 2 is a diagram illustrating a multi-flight path synthetic aperture radar simulation system.

FIG. 2 is a diagram illustrating a multi-flight path synthetic aperture radar simulation system. In FIG. 2, system 200 includes SAR satellite 210, flight path 211, flight path 212, topography 223, building/infrastructure 224, building/infrastructure 225, computer system 250, communication link 265, and simulated image 271. Simulated image 271 includes simulated image 271*a* of building 224 and simulated image 271*b* of building 225.

In FIG. 2, satellite 210 illuminates building 224 and building 225 while on flight path 212. Building 225 will be shadowed by building 225 during flight path 211. Thus, when flight path 211 is simulated, simulated image 271 would not include an image 271*b* of building 225. However, when flight path 212 is simulated, simulated image 271 would include an both an image 271*a* of building 224, an image 271*b* of building 225, and topographies and landscapes surrounding buildings 224 and 225.

Figure 3:
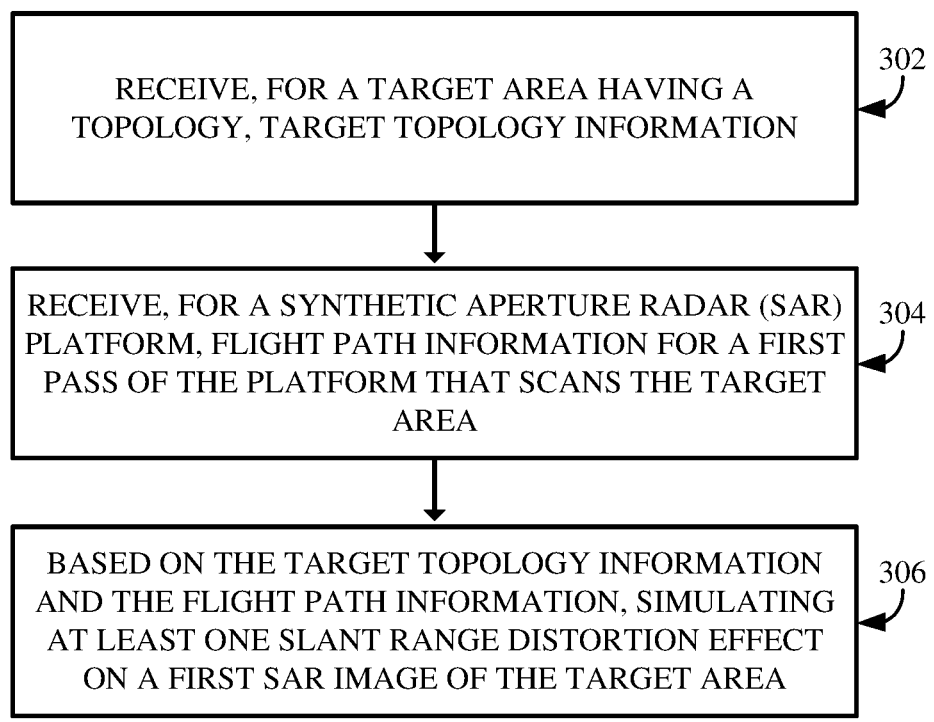
FIG. 3 is a flowchart illustrating a method of simulating slant range distortion effects on a synthetic aperture radar (SAR) image.

FIG. 3 is a flowchart illustrating a method of simulating slant range distortion effects on a synthetic aperture radar (SAR) image. The steps illustrated in FIG. 3 may be performed by, for example, one or more of system 100, system 200, and/or their components. For a target area having a topology, target topology information is received (302). For example, for target area 120, system 150 may receive topology information 151 that includes topography information 152 and building/infrastructure information 153.

For a synthetic aperture radar platform, flight path information for a first pass of the platform that scans the target area is received (304). For example, for flight path 111 of satellite 110 to scan target area 120, system 150 may receive track information 155. Based on the target topology information and the flight path information, at least one slant range distortion effect is simulated on a first SAR image of the target area (306), which may be used during change detection processes among other functions. For example, based on topology information 151 and track information 155, system 150 may simulate at least one of foreshortening, layover, and/or shadowing of topography 123 and/or building/infrastructure 124. Additionally, system 150 can remove topography 123 and/or building/infrastructure 124 during change detection processes to identify and simulate temporal change in the landscape captured in target area 120. Temporal change can identify unknown or potential patterns in the landscape, simulate or forecast landscape developments, and predict other effects on the topology based at least on topology information 151 and track information 155.

Figure 4:
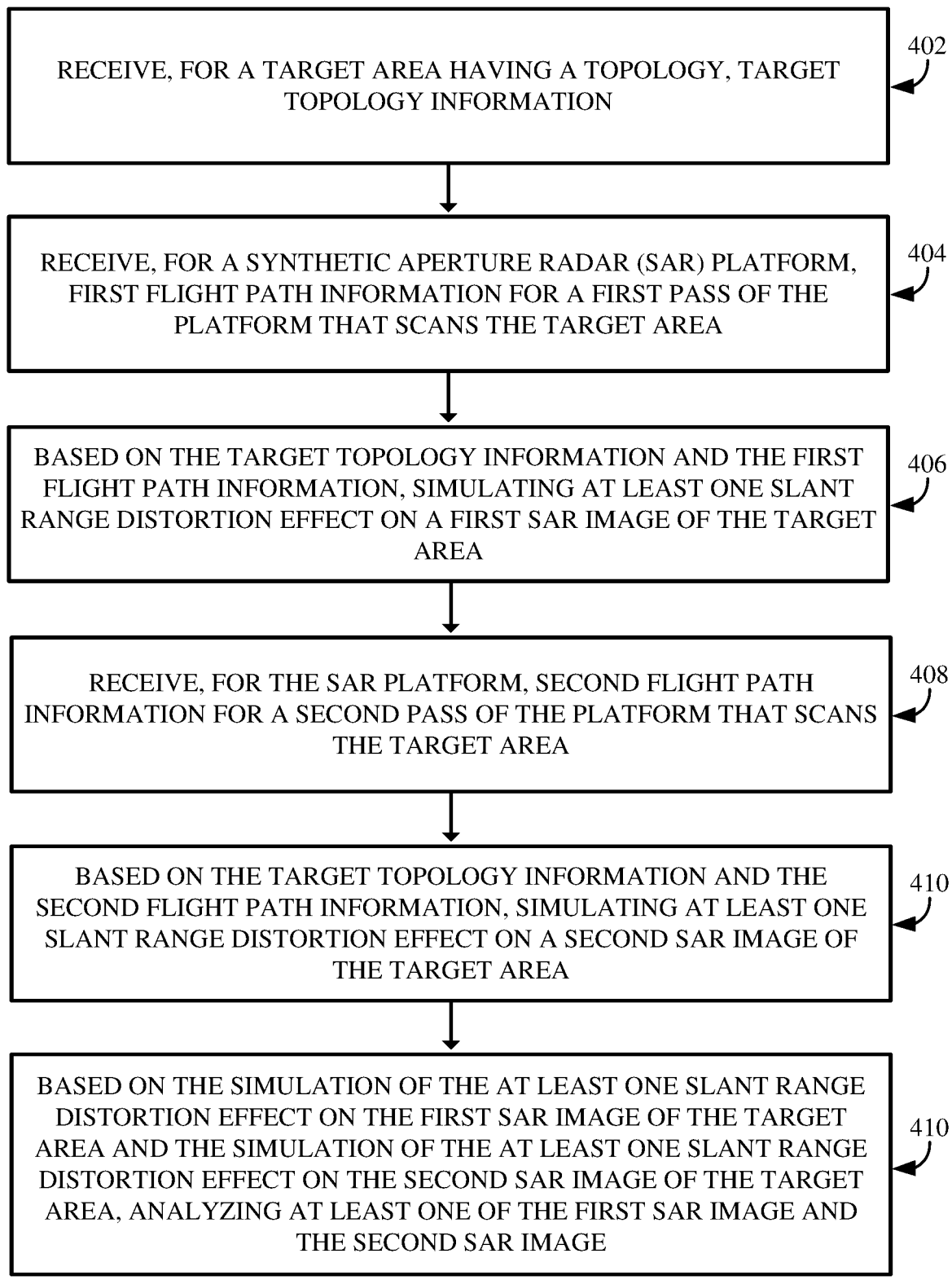
FIG. 4 is a flowchart illustrating a method of analyzing SAR images.

FIG. 4 is a flowchart illustrating a method of analyzing SAR images. The steps illustrated in FIG. 3 may be performed by, for example, one or more of system 100, system 200, and/or their components. For a target area having a topology, target topology information is received (402). For example, for a target area, system 250 may receive topology information that includes topography information about topography 223 and building/infrastructure information about building 224-225.

For a synthetic aperture radar platform, first flight path information for a first pass of the platform that scans the target area is received (404). For example, for flight path 211 of satellite 210 to scan a target area, system 250 may receive track information. Based on the target topology information and the first flight path information, at least one slant range distortion effect is simulated on a first SAR image of the target area (406). For example, for flight path 211 of satellite 210 to scan the target area and based on topology information and track information, system 250 may simulate at least one of foreshortening, layover, and/or shadowing of topography 223 and/or buildings 224-225.

For a synthetic aperture radar platform, second flight path information for a second pass of the platform that scans the target area is received (408). For example, for flight path 212 of satellite 210 to scan the target area, system 250 may receive track information. Based on the target topology information and the second flight path information, at least one slant range distortion effect is simulated on a second SAR image of the target area (410). For example, for flight path 212 of satellite 210 to scan the target area and based on topology information and track information, system 250 may simulate at least one of foreshortening, layover, and/or shadowing of topography 223 and/or buildings 224-225.

Based on the simulation of the at least one slant range distortion effect on the first SAR image of the target area and the simulation of the at least one slant range distortion effect on the second SAR image, at least one of the first SAR image and the second SAR image are analyzed (412). For example, based on the shadowing of building 225 in the first SAR image from flight path 211, system 250 may use the second SAR image from flight path 212 to analyze the image 271*b* of building 225. While building and topography information can be used by system 250 to perform change detection processes, other embodiments can be utilized to identify temporal changes. In such embodiments, system 250 can remove topography 223 and/or buildings 224-225 to identify and simulate temporal change in the landscape captured in the target area. Temporal change analysis can identify unknown or potential patterns in the landscape, simulate or forecast landscape developments, and predict other effects on the topology based at least on topology information and track information.

Figure 5:
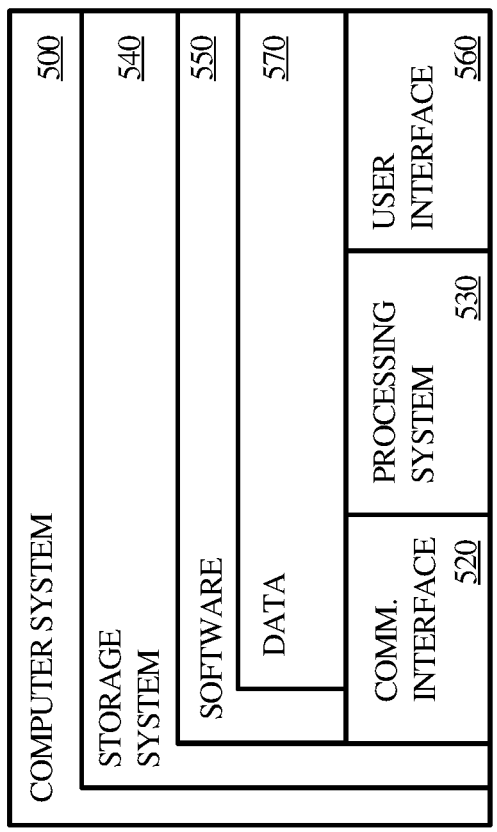
FIG. 5 is a block diagram illustrating a computer system.

FIG. 5 is a block diagram illustrating a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 5 illustrates a block diagram of an example computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 500 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1: A method, comprising: receiving, for a target area having a topology, target topology information; receiving, for a synthetic aperture radar (SAR) platform, flight path information for a first pass of the platform that scans the target area; and, based on the target topology information and the flight path information, simulating at least one slant range distortion effect on a first SAR image of the target area.

Example 2: The method of example 1, wherein the target topology information comprises a building footprint of an associated building in the target area.

Example 3: The method of example 2, wherein the target topology information includes elevation data in the target area.

Example 4: The method of example 3, further comprising: generating a second SAR image of the target area that compensates for a simulated at least one slant range distortion effect.

Example 5: The method of example 3, wherein simulating the at least one slant range distortion effect comprises simulating, based on an associated building footprint, layover caused by the associated building.

Example 6: The method of example 3, wherein simulating the at least one slant range distortion effect comprises simulating, based on the elevation data in the target area, foreshortening caused by the topology.

Example 7: The method of example 3, wherein simulating the at least one slant range distortion effect comprises simulating, based on an associated building footprint, shadowing effects caused by the associated building.

Example 8: A method, comprising: receiving, for a target area having a topology, target topology information; receiving, for a synthetic aperture radar (SAR) platform, first flight path information for a first pass of the platform that scans the target area; based on the target topology information and the first flight path information, simulating at least one slant range distortion effect on a first SAR image of the target area; receiving, for the SAR platform, second flight path information for a second pass of the platform that scans the target area; based on the target topology information and the second flight path information, simulating at least one slant range distortion effect on a second SAR image of the target area; and, based on the simulation of the at least one slant range distortion effect on the first SAR image of the target area and the simulation of the at least one slant range distortion effect on the second SAR image of the target area, analyzing at least one of the first SAR image and the second SAR image.

Example 9: The method of example 8, wherein analyzing at least one of the first SAR image and the second SAR image comprises determining whether a change in the topology of the target area has occurred.

Example 10: The method of example 8, wherein analyzing at least one of the first SAR image and the second SAR image comprises determining whether a change in an associated building footprint in the target area has occurred.

Example 11: The method of example 8, wherein the target topology information comprise at least one building footprint associated with a building in the target area.

Example 12: The method of example 8, wherein the target topology information includes elevation data associated with the target area.

Example 13: The method of example 11, wherein simulating the at least one slant range distortion effect comprises simulating, based on a building footprint associated with a building, layover caused by the building.

Example 14: The method of example 13, wherein simulating the at least one slant range distortion effect comprises simulating, based on the building footprint, shadowing effects caused by the building.

Example 15: The method of example 12, wherein simulating the at least one slant range distortion effect comprises simulating, based on the elevation data in the target area, foreshortening caused by the topology.

Example 16: A non-transitory computer readable medium having instructions stored thereon for simulating slant range distortion effects on synthetic aperture radar (SAR) images that, when executed by a computer, at least instruct the computer to: receive, for a target area having a topology, target topology information; receive, for a synthetic aperture radar (SAR) platform, first flight path information for a first pass of the platform that scans the target area; based on the target topology information and the first flight path information, simulate at least one slant range distortion effect on a first SAR image of the target area; receive, for the SAR platform, second flight path information for a second pass of the platform that scans the target area; based on the target topology information and the second flight path information, simulate at least one slant range distortion effect on a second SAR image of the target area; and, based on the simulation of the at least one slant range distortion effect on the first SAR image of the target area and the simulation of the at least one slant range distortion effect on the second SAR image of the target area, analyze at least one of the first SAR image and the second SAR image.

Example 17: The non-transitory computer readable medium of example 16, wherein analyzing at least one of the first SAR image and the second SAR image comprises determining whether a change in the topology of the target area has occurred.

Example 18: The non-transitory computer readable medium of example 16, wherein analyzing at least one of the first SAR image and the second SAR image comprises determining whether a change in a building footprint in the target area has occurred.

Example 19: The non-transitory computer readable medium of example 16, wherein the target topology information comprise at least one building footprint in the target area.

Example 20: The non-transitory computer readable medium of example 16, wherein the target topology information includes elevation data associated with the target area.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method, comprising:
   receiving, for a target area having a topology, target topology information;
   receiving, for a synthetic aperture radar (SAR) platform, flight path information for a first pass of the platform that scans the target area; and,
   based on the target topology information and the flight path information, simulating at least one slant range distortion effect on a first SAR image of the target area.

2. The method of claim 1, wherein the target topology information comprises a building footprint of an associated building in the target area.

3. The method of claim 2, wherein the target topology information includes elevation data in the target area.

4. The method of claim 3, further comprising:
   generating a second SAR image of the target area that compensates for a simulated at least one slant range distortion effect.

5. The method of claim 3, wherein simulating the at least one slant range distortion effect comprises simulating, based on an associated building footprint, layover caused by the associated building.

6. The method of claim 3, wherein simulating the at least one slant range distortion effect comprises simulating, based on the elevation data in the target area, foreshortening caused by the topology.

7. The method of claim 3, wherein simulating the at least one slant range distortion effect comprises simulating, based on an associated building footprint, shadowing effects caused by the associated building.

8. A method, comprising:
   receiving, for a target area having a topology, target topology information;
   receiving, for a synthetic aperture radar (SAR) platform, first flight path information for a first pass of the platform that scans the target area;
   based on the target topology information and the first flight path information, simulating at least one slant range distortion effect on a first SAR image of the target area;
   receiving, for the SAR platform, second flight path information for a second pass of the platform that scans the target area;

based on the target topology information and the second flight path information, simulating at least one slant range distortion effect on a second SAR image of the target area; and, based on the simulation of the at least one slant range distortion effect on the first SAR image of the target area and the simulation of the at least one slant range distortion effect on the second SAR image of the target area, analyzing at least one of the first SAR image and the second SAR image.

9. The method of claim 8, wherein analyzing at least one of the first SAR image and the second SAR image comprises determining whether a change in the topology of the target area has occurred.

10. The method of claim 8, wherein analyzing at least one of the first SAR image and the second SAR image comprises determining whether a change in an associated building footprint in the target area has occurred.

11. The method of claim 8, wherein the target topology information comprise at least one building footprint associated with a building in the target area.

12. The method of claim 11, wherein simulating the at least one slant range distortion effect comprises simulating, based on a building footprint associated with a building, layover caused by the building.

13. The method of claim 12, wherein simulating the at least one slant range distortion effect comprises simulating, based on the building footprint, shadowing effects caused by the building.

14. The method of claim 8, wherein the target topology information includes elevation data associated with the target area.

15. The method of claim 12, wherein simulating the at least one slant range distortion effect comprises simulating, based on the elevation data in the target area, foreshortening caused by the topology.

16. A non-transitory computer readable medium having instructions stored thereon for simulating slant range distortion effects on synthetic aperture radar (SAR) images that, when executed by a computer, at least instruct the computer to:

receive, for a target area having a topology, target topology information;

receive, for a synthetic aperture radar (SAR) platform, first flight path information for a first pass of the platform that scans the target area;

based on the target topology information and the first flight path information, simulate at least one slant range distortion effect on a first SAR image of the target area;

receive, for the SAR platform, second flight path information for a second pass of the platform that scans the target area;

based on the target topology information and the second flight path information, simulate at least one slant range distortion effect on a second SAR image of the target area; and, based on the simulation of the at least one slant range distortion effect on the first SAR image of the target area and the simulation of the at least one slant range distortion effect on the second SAR image of the target area, analyze at least one of the first SAR image and the second SAR image.

17. The non-transitory computer readable medium of claim 16, wherein analyzing at least one of the first SAR image and the second SAR image comprises determining whether a change in the topology of the target area has occurred.

18. The non-transitory computer readable medium of claim 16, wherein analyzing at least one of the first SAR image and the second SAR image comprises determining whether a change in a building footprint in the target area has occurred.

19. The non-transitory computer readable medium of claim 16, wherein the target topology information comprise at least one building footprint in the target area.

20. The non-transitory computer readable medium of claim 16, wherein the target topology information includes elevation data associated with the target area.

* * * * *